(12) United States Patent
Fujita et al.

(10) Patent No.: US 10,014,097 B2
(45) Date of Patent: Jul. 3, 2018

(54) SEMICONDUCTOR CERAMIC COMPOSITION AND PTC THERMISTOR

(71) Applicant: TDK CORPORATION, Tokyo (JP)

(72) Inventors: Kazutaka Fujita, Tokyo (JP); Kazuhiko Itoh, Tokyo (JP); Yoshikazu Shimura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 6 days.

(21) Appl. No.: 15/222,050

(22) Filed: Jul. 28, 2016

(65) Prior Publication Data

US 2017/0040092 A1 Feb. 9, 2017

(30) Foreign Application Priority Data

Aug. 4, 2015 (JP) ................................. 2015-153786

(51) Int. Cl.
*H01C 7/02* (2006.01)
*C04B 35/468* (2006.01)
(Continued)

(52) U.S. Cl.
CPC ......... *H01C 7/027* (2013.01); *C04B 35/4682* (2013.01); *C04B 35/6261* (2013.01); *C04B 35/6263* (2013.01); *C04B 35/62625* (2013.01); *C04B 35/62645* (2013.01); *C04B 35/64* (2013.01); *H01C 1/1406* (2013.01); *H01C 7/025* (2013.01); *C04B 2235/3201* (2013.01); *C04B 2235/3208* (2013.01); *C04B 2235/3225* (2013.01); *C04B 2235/3227* (2013.01); *C04B 2235/3229* (2013.01);
(Continued)

(58) Field of Classification Search
CPC .... H01C 7/027; H01C 7/025; C04B 35/4682; C04B 35/6261; C04B 35/62625
USPC ..................................................... 338/22 SD
See application file for complete search history.

(56) References Cited

U.S. PATENT DOCUMENTS

2009/0201121 A1* 8/2009 Katsu .................. C04B 35/4682
   338/22 SD
2012/0172194 A1* 7/2012 Park .................... C04B 35/4682
   501/137
(Continued)

FOREIGN PATENT DOCUMENTS

EP    1 598 326 A1    11/2005
EP    2 377 836 A1    10/2011
(Continued)

OTHER PUBLICATIONS

Dec. 15, 2016 Extended Search Report issued in European Patent Application No. 16182408.1.

*Primary Examiner* — Kyung Lee
*Assistant Examiner* — Iman Malakooti
(74) *Attorney, Agent, or Firm* — Oliff PLC (57) ABSTRACT

A semiconductor ceramic composition including a compound represented by the following general formula (1) as a main component.

$$(Ba_vBi_xA_yRE_w)_m(Ti_uTM_z)O_3 \quad (1)$$

(wherein, A represents both elements of Na and K; RE is at least one element selected from the group consisting of Y, La, Ce, Pr, Nd, Sm, Gd, Dy and Er; and TM is at least one element selected from the group consisting of V, Nb and Ta.)

$$0.01 \leq x \leq 0.15 \quad (2)$$

$$x \leq y \leq 0.3 \quad (3)$$

$$0 \leq (w+z) \leq 0.01 \quad (4)$$

$$v+x+y+w=1 \quad (5)$$

$$u+z=1 \quad (6)$$

$$0.950 \leq m \leq 1.050 \quad (7)$$

further, 0.001 mol to 0.055 mol of Ca is included and the ratio of Na/(Na+K) is 0.1 or more and less than 1.

8 Claims, 1 Drawing Sheet

(51) Int. Cl.
*C04B 35/626* (2006.01)
*C04B 35/64* (2006.01)
*H01C 1/14* (2006.01)

(52) U.S. Cl.
CPC .............. *C04B 2235/3234* (2013.01); *C04B 2235/3239* (2013.01); *C04B 2235/3251* (2013.01); *C04B 2235/3253* (2013.01); *C04B 2235/3255* (2013.01); *C04B 2235/3262* (2013.01); *C04B 2235/3298* (2013.01); *C04B 2235/3418* (2013.01); *C04B 2235/602* (2013.01); *C04B 2235/606* (2013.01); *C04B 2235/658* (2013.01); *C04B 2235/6562* (2013.01); *C04B 2235/6565* (2013.01); *C04B 2235/79* (2013.01); *C04B 2235/9607* (2013.01)

(56) References Cited

U.S. PATENT DOCUMENTS

2015/0097650 A1* 4/2015 Shimura ................ H01C 7/025
                                                            338/22 SD
2016/0027560 A1* 1/2016 Itoh ........................ H01C 7/02
                                                            338/22 R

FOREIGN PATENT DOCUMENTS

| EP | 2 377 837 A1 | 10/2011 |
| EP | 2 819 196 A1 | 12/2014 |
| JP | S56-169301 A | 12/1981 |
| JP | 2012-209292 A | 10/2012 |
| WO | 2014/141814 A1 | 9/2014 |

\* cited by examiner

SEMICONDUCTOR CERAMIC COMPOSITION AND PTC THERMISTOR

The present invention relates to a semiconductor ceramic composition and a PTC thermistor, which may be used in a heater element or an overheat detection element and the like.

BACKGROUND

As one of thermistors, a PTC (Positive Temperature Coefficient) thermistor with a positive temperature coefficient of resistance has been known. The PTC thermistor will have an increase in the resistance against the increase of the temperature, thus it can be used as a self-regulated heater element, an over current protection element, an overheat detection element and the like. In the prior art, a PTC thermistor has been obtained by adding a minute amount of rear earth elements and the like to barium titanate ($BaTiO_3$) which is the main component to form a semiconductor. Although it has a low resistance below the Curie Point, it will have a sharp increase in the resistance by several orders of magnitude above the Curie Point.

The Curie Point of $BaTiO_3$ is usually about 120° C. However, it can be shifted to a lower temperature by replacing a part of Ba and Ti with Sr or Sn and Zr. Especially, the Curie Point is required to be high for the PTC thermistor used as a heater because the PTC thermistor with high Curie point generates high temperature heat source. However, as for the shift of the Curie Point to higher temperature, it has been realized by replacing a part of Ba with Pb at present. From the view point of the trend of decreasing the environmental load of the world, practical application of a replacement material without using Pb has been demanded.

In the following Patent Document 1, a method for producing a semiconductor ceramic composition has been disclosed. In the method, one or more of any of Nb, Ta or a rare earth element are added into a composition consisting of $Ba_{1-2x}(BiNa)_xTiO_3$ (0<X≤0.15), in which a part of Ba is replaced with (BiNa) rather than Pb. Then, after the composition is sintered in nitrogen, it is heat-treated in an oxidation atmosphere.

In addition, in the following Patent Document 2, a method for producing a semiconductor ceramic composition has been disclosed. In the method, for a semiconductor ceramic composition in which a part of Ba in $BaTiO_3$ is replaced with Bi and alkali metal(s) (which is at least one selected from the group consisting of Na, K and Li), as a manner applied to suppress the resistance change rate of the resistance value after electrifying the semiconductor ceramic composition for a long time, the ratio of the measured density relative to the theoretical density (herein after, referred as "relative density") of the sintered compact of the composition is set to be 70~90%.

All of the above mentioned Patent documents have disclosed that, a semiconductor ceramic composition without using Pb, which has a Curie Point shifted to a temperature higher than 120° C., and a small resistivity at 25° C can be obtained.

PATENT DOCUMENTS

Patent Document 1: JPS56-169301A
Patent Document 2: JP2012-209292A

SUMMARY

In the above mentioned Patent Document 1, there is a description regarding the results of heat-treatment carried out in the oxidation atmosphere after adding Nd to the composition of $Ba_{1-2x}(BiNa)_xTiO_3$ (0<X≤0.15) and sintering in nitrogen atmosphere. However, there is no detailed description regarding the case of adding other semiconducting agents, and it is unknown about the additive effects and its degree on the properties. Further, since semiconductor cannot be formed by sintering in the air, there is a problem that the production cost will be increased compared to the case of sintering in the air.

In the semiconductor ceramic composition described in Patent Document 2, the resistance change rate $\Delta\rho/\rho_0$ is suppressed to be 28% by adjusting the relative density of the sintered compact to be 70~90% while the resistance change rate is 67% in the normal state without adjustment. However, in practical, it is desired to be further lowered.

Further, refer to the definition of the resistance change rate $\Delta\rho/\rho_0$, in Patent Document 2, it is calculated by the method as follows. After an electrifying experiment is carried out by applying a DC voltage of 20V for 1000 hours, the resistivity $\rho_0$ before the electrifying experiment and the resistivity $\rho_1$ after the electrifying experiment are respectively measured at an environmental temperature of 25° C. Then the difference $\Delta\rho(=\rho_1-\rho_0)$ is calculated and the resistance change rate $\Delta\rho/\rho_0$ is calculated.

The resistivity at 25° C. of the PTC thermistor is expected to be low resistance from the view point of energy conservation. Usually, it will deteriorate over years accompanying with a long-term electrifying time and the resistivity at 25° C. tends to increase. Thus, the resistance change rate $\Delta\rho/\rho_0$ is one of the important indexes for ensuring the reliability of the PTC thermistor.

At the same time, for the PTC thermistor utilized in the electric car which will have an enlarged demand in future, a high voltage is to be applied without a transformer. Thus, an excellent withstand voltage property is required.

Herein, the present invention aims to provide a semiconductor ceramic composition and a PTC thermistor including the semiconductor ceramic composition, wherein the semiconductor ceramic composition is a $BaTiO_3$ based semiconductor ceramic composition having a Curie Point shifted to a temperature higher than 120° C. without using Pb. The semiconductor ceramic composition can be easily turned to be a semiconductor no matter it is sintered in the air or in nitrogen atmosphere. The semiconductor ceramic composition can ensure that the resistivity at 25° C. is at a level of being practical and at the same time ensure that the resistance change rate $\Delta\rho/\rho_0$ is small and also the withstand voltage property is excellent.

In order to solve the problem mentioned above, the inventors have done a lot of research. As the results, they found a $BaTiO_3$ based semiconductor ceramic composition which can be easily turned to be a semiconductor no matter it is sintered in the air or in nitrogen atmosphere, having a resistivity at 25° C. suppressed to be 500 Ωcm or lower, a resistance change rate $\Delta\rho/\rho_0$ suppressed to be 20% or lower, a withstand voltage $V_0$ of 400 V/mm or above and also a Curie Point shifted to a temperature higher than 120° C. by replacing a part of Ba with Bi and alkali metal(s) (containing both Na and K) rather than Pb and confining the molar ratio of Ba site/Ti site, the adding amount of Ca, and the ratio of Na and K within the specified range.

That is, the present invention provides a semiconductor ceramic composition comprising a sintered compact which contains a $BaTiO_3$ based compound represented by the following general formula (1) as the main component, wherein:

$$(Ba_vBi_xA_yRE_w)_m(Ti_uTM_z)O_3 \qquad (1).$$

in the above general formula (1), A contains both elements of Na and K; RE is at least one element selected from the group consisting of Y, La, Ce, Pr, Nd, Sm, Gd, Dy and Er; TM is at least one element selected from the group consisting of V, Nb and Ta; w, x, y, z and m satisfies the following formulas of (2)~(7), $$0.01 \leq x \leq 0.15 \tag{2}$$

$$x \leq y \leq 0.3 \tag{3}$$

$$0 \leq (w+z) \leq 0.01 \tag{4}$$

$$v+x+y+w=1 \tag{5}$$

$$u+z=1 \tag{6}$$

$$0.950 \leq m \leq 1.050 \tag{7}$$

the semiconductor ceramic composition further comprises Ca in the proportion of 0.001 mol or more and 0.055 mol or less in terms of element relative to 1 mol of Ti site (the total number of moles of Ti and TM); and the ratio of Na/(Na+K) is 0.1 or more and less than 1.

The inventors think that, as the reasons for exhibiting such performances, by confining the adding amount and the ratio of Bi and alkali metal A (containing both Na and K) within a specific range and controlling in a way that A is excessive, the excessive A will promote the formation of a semiconductor and will promote an appropriate grain growing as a sintering aid. As a result, a semiconductor ceramic composition with a Curie Point shifted to a temperature higher than 120° C. and a low resistance can be obtained in a sintering process under any atmosphere of air or nitrogen atmosphere. In addition, the alkali metal A can dissolve in the Ba site stably as solid-solution by Ca dissolving in the Ba site as solid-solution, thus, the migration of alkali metal A ions when electrified can be prevented, and the resistance change rate $\Delta \rho / \rho_0$ can be suppressed to be small. In addition, it is considered that K dissolves in Ba site as solid-solution which is more stable than Na, thus, K can prevent the precipitation of alkali metal A ions in the grain boundary and as a result, the withstand voltage can be increased. Specifically, a semiconductor ceramic composition having the following properties can be obtained. That is, the resistivity at 25° C. is suppressed to be 500 Ωcm or lower; the resistance change rate $\Delta \rho / \rho_0$ is suppressed to be 20% or lower; the withstand voltage $V_0$ is 400 V/mm or above; and the Curie Point is shifted to a temperature higher than 120° C. However, the mechanism for semiconductor formation is not restricted to this.

In addition, the semiconductor ceramic composition mentioned above preferably further comprises Si in the proportion of 0.035 mol or less in terms of element relative to 1 mol of Ti site (the total amount of Ti and TM: u+z). An effect of decreasing the resistivity at 25° C. can be improved by comprising Si in the range mentioned above.

In addition, the semiconductor ceramic composition mentioned above preferably further comprises Mn in the proportion of 0.0015 mol or less in terms of element relative to 1 mol of Ti site (the total amount of Ti and TM: u+z). There is an effect of increasing the variation amplitude of the increased resistance under a temperature above the Curie Point relative to the resistivity at 25° C. (hereinafter, referred as "PTC jump" for convenience) by comprising Mn in the range mentioned above. Further, PTC jump is an index for judging the performances of the PTC thermistor and is calculated as a value of $Log_{10}$(the resistivity at 280° C./ the resistivity at 25° C.).

According to the present invention, a semiconductor ceramic composition can be obtained as a $BaTiO_3$ based semiconductor ceramic composition, wherein Pb is not comprised, the semiconductor ceramic composition can be easily turned to be a semiconductor no matter it is sintered in the air or in nitrogen atmosphere, a resistivity at 25° C. is suppressed to be 500 Ωcm or lower, while a resistance change rate $\Delta \rho / \rho_0$ is small, a withstand voltage $V_0$ is 400 V/mm or above and a Curie Point is shifted to a temperature higher than 120° C. Especially, a PTC thermistor having the semiconductor ceramic composition mentioned above can be expected for an application in a heater element.

DETAILED DESCRIPTION OF EMBODIMENTS

Figure 1:
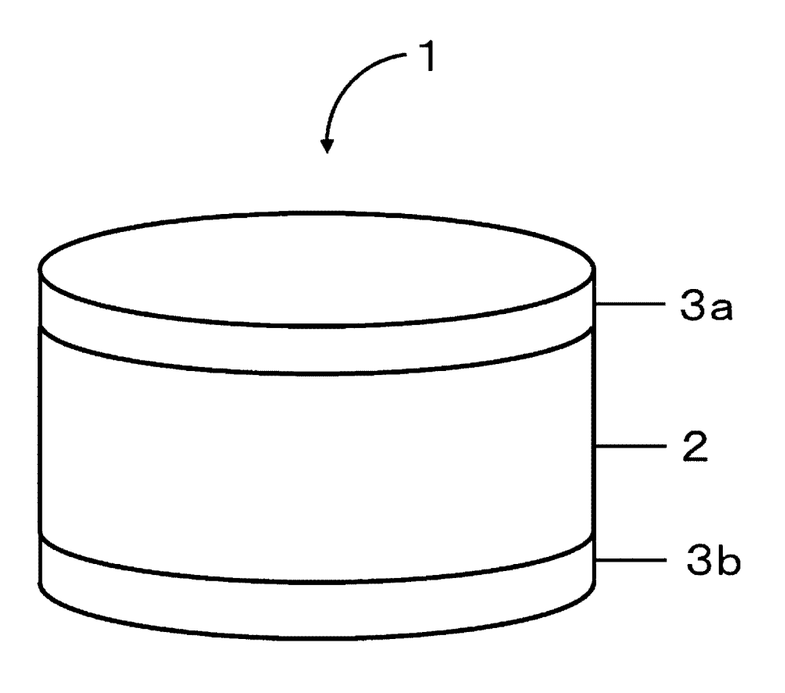
FIG. 1 is a perspective view showing a configuration example of the PTC thermistor having the semiconductor of the embodiment of the present invention.

As shown in FIG. 1, PTC thermistor 1 includes ceramic body 2 and electrodes 3a and 3b which are formed on two opposite main surfaces of the ceramic body. Electrodes 3a and 3b can be formed by an one-layered structure or a multi-layered structure made of conductive material(s) of Cu, Ni, Al, Cr, Zn, Ag, Ni—Cr alloy, Ni—Cu alloy or the like.

The composition of the present invention comprises a sintered compact comprising a $BaTiO_3$ based compound represented by the following general formula (1) in terms of molar ratio as a main component, and further comprises Ca as a subcomponent.

$$(Ba_vBi_xA_yRE_w)_m(Ti_uTM_z)O_3 \tag{1}$$

wherein, A contains both elements of Na and K; RE is at least one element selected from the group consisting of Y, La, Ce, Pr, Nd, Sm, Gd, Dy and Er; and TM is at least one element selected from the group consisting of V, Nb and Ta.

In the above general formula (1), u, v, w, x, y, z and m, which represent the amount of replacing a part of Ba site with Bi, A, and RE for, the amount of replacing a part of Ti site with TM, and the ratio of Ba site to Ti site respectively, satisfy the following formulas of (2)~(7).

$$0.01 \leq x \leq 0.15 \tag{2}$$

$$x \leq y \leq 0.3 \tag{3}$$

$$0 \leq (w+z) \leq 0.01 \tag{4}$$

$$v+x+y+w=1 \tag{5}$$

$$u+z=1 \tag{6}$$

$$0.950 \leq m \leq 1.050 \tag{7}$$

In addition, in the composition represented by general formula (1), Ca is contained in the proportion of 0.001 mol or more and 0.055 mol or less in terms of element relative to 1 mol of Ti site (the total number of moles of Ti and TM).

In addition, said semiconductor ceramic composition preferably further comprises Si in the proportion of 0.035 mol or less, more preferably 0.005 mol or more and 0.02 mol or less, in terms of element relative to 1 mol of Ti site (the total number of moles of Ti and TM) in the general formula (1). Si precipitated in the grain boundaries can form compounds with alkali metals of Na and K precipitated in a micro amount in the same grain boundaries respectively, and the migration of the alkali metals of Na and K ions when electrified can be suppressed. Thus, an effect of decreasing the resistivity at 25° C. is further improved. However, if the amount of Si exceeds 0.035 mol, the excessive Si elements will precipitate in a large amount in the grain boundaries, and will prevent the migration of the conducting electrons leading to the resistivity at 25° C. tending to increase.

Further, said semiconductor ceramic composition preferably further comprises Mn in the proportion of 0.0015 mol or less, more preferably 0.0002 mol or more and 0.0010 mol or less, in terms of element relative to 1 mol of Ti site (the total number of moles of Ti and TM). When Mn is comprised in such a range, appropriate acceptor level is formed in the grain boundaries, and there is an effect of improving the PTC jump. However, if the amount of Mn exceeds 0.0015 mol, the traps for the conducting electrons will be excessive, and the resistivity at 25° C. will tend to increase.

In the general formula (1), the component range x of Bi is in a range of $0.01 \leq x \leq 0.15$. When x is less than 0.01, since the amount of Bi component is too small, the Curie Point will not shift to a higher temperature. In addition, if x exceeds 0.15, the semiconductor formation will be insufficient and the resistivity at 25° C. will be more than 500 Ωcm. The Curie Point of the present invention refers to the temperature under which the resistivity of the element is twice compared to the resistivity of the element under 25° C.

In the general formula (1), A contains both elements of Na and K, and y is in a range of $x \leq y \leq 0.3$. When y<x, the withstand voltage $V_0$ will not increase. Further, if y exceeds 0.3, the semiconductor formation will be insufficient and the resistivity at 25° C. will be more than 500 Ωcm.

In the general formula (1), there is a correlation between the component range of Na and K. The ratio of Na/(Na+K) is preferred to be in a range of 0.1 or more and less than 1. When the ratio of Na/(Na+K) is less than 0.1, K is excessive and thus semiconductor formation will be insufficient and the resistivity at 25° C. will be more than 500 Ωcm. Further, when Na/(Na+K) is 1, Na and K cannot be contained simultaneously, thus the withstand voltage $V_0$ will decrease.

Further, in the general formula (1), if the total amount of RE and TM as the donor components: (w+z) is 0.01 mol or less relative to 1 mol of Ti site (the total number of moles of Ti and TM), there will be an effect of decreasing the resistivity at 25° C. and an effect of increasing the withstand voltage. However, (w+z) may also be 0. Further, (w+z) is preferred to be 0.001 mol or more and 0.005 mol or less. In addition, if (w+z) exceeds 0.01, the excessive RE or TM will precipitate in the grain boundaries, and will prevent the migration of the conducting electrons leading to the resistivity at 25° C. exceeding 500 Ωcm, thus it is not preferred. Further, it is preferred to select Sm, Gd, and Er as RE and select Nb as TM. In addition, it is more preferable to add equal amounts of RE (Sm, Gd, and Er) and TM (Nb) each. The effect of decreasing the resistivity at 25° C. will be further improved by using the donors and the adding methods mentioned above.

In the general formula (1), m is preferably in a range of $0.950 \leq m \leq 1.050$. If m is less than 0.950, the semiconductor formation will be insufficient and the resistivity at 25° C. will be more than 500 Ωcm, thus it is not preferred. Additionally, if m is more than 1.050, the sintered density will decrease and the withstand voltage $V_0$ will decrease to a level less than 400 V/mm, thus it is not preferred. It is preferred that by setting the range of $0.980 \leq m \leq 1.050$, the effect of decreasing the resistivity at 25° C. will be further improved.

Further, in the general formula (1), the component range of Ca added as a subcomponent is 0.001 mol or more and 0.055 mol or less relative to 1 mol of Ti site (the total number of moles of Ti and TM). When the component range of Ca is less than 0.001 mol, the semiconductor formation will be insufficient and the resistivity at 25° C. will be more than 500 Ωcm. In addition, if the component range of Ca exceeds 0.055 mol, the sintered density will decrease, and the withstand voltage $V_0$ will decrease. It is more preferred that by setting the range of 0.01 mol or more and 0.04 mol or less, the resistivity at 25° C. can be further decreased.

The semiconductor ceramic composition with the characters mentioned above, for example, can be manufactured by the following method.

As raw materials, powders of bismuth oxide ($Bi_2O_3$), sodium carbonate ($Na_2CO_3$), titanium oxide ($TiO_2$), barium carbonate ($BaCO_3$), potassium carbonate ($K_2CO_3$), calcium carbonate ($CaCO_3$), rare earth(s) such as lanthanum oxide ($La_2O_3$), niobium oxide ($Nb_2O_5$), tantalum oxide ($Ta_2O_5$), vanadium oxide ($V_2O_5$), manganese carbonate ($MnCO_3$), silicon oxide ($SiO_2$) or the like are prepared according to the requirements and weighed according to the aimed composition.

Further, in the raw materials, compounds such as carbonates or oxalates which can be turned to be oxides by sintering may also be used for replacing the oxides.

Further, the weighed raw materials are dried sufficiently after they are mixed sufficiently for 5 hours to 20 hours in an organic solvent or pure water by ball mill. The temperature for drying is about 90° C. for example. However, if the raw materials mentioned above is dry mixed, the drying process can be omitted.

The dried raw materials are press-molded to prepare a molded compact for calcinating or the dried raw materials are directly calcinated as powder under 650° C. to 950° C. for about 1 hour to 20 hours. The heating rate and the cooling rate in the calcinating process are both set as, for example, about 50° C./hour to 300° C./hour. The calcination in the present embodiment is performed in the air, but it is not confined by the level of the partial pressure of oxygen.

The calcinated materials are sufficiently pulverized by, for example, a ball mill or the like in an organic solvent or in water for 5 hours to 20 hours and then dried sufficiently. The temperature for drying is, for example, about 90° C.

The dried calcinated materials are added with organic binder solution (Polyvinyl Alcohol: PVA) for granulating. After granulating, the granulated powders are molded by uniaxial pressing to a cylinder, a prism, a disc plate or a square plate.

Preferably, after the processes mentioned above, Cold Isostatic Pressing (CIP) process can be further performed. In this regard, Isostatic Pressing is more preferably performed under a max loading pressure of 98 MPa to 343 MPa for 1 to 3 minutes.

The obtained compact by the processes mentioned above is heat-treated under 400° C. to 800° C. for about 2 hours to 4 hours to volatilize the binder and then sintered for about 2 hours to 4 hours under 950° C. to 1300° C. The heating rate and the cooling rate in the sintering process are both set as, for example, about 50° C./hour to 300° C./hour. The sintering in the present embodiment is performed in the air, but it is not confined by the level of the partial pressure of oxygen.

Further, if the sintering is performed in nitrogen atmosphere, a further heating treatment in an oxidative atmosphere under 800 to 1000° C. is required. Thus, it is preferable to perform the sintering in the air from the view point of simplification of the processes.

The obtained sintered compact is ground according to the requirements and then is provided with electrodes. The electrodes can be formed by coating the electrode paste and then baking. Furthermore, the electrodes can also be formed by vapor deposition or sputtering deposition or the like.

FIG. 1 shows a configuration example of the PTC thermistor having the semiconductor of the embodiment of the present invention. PTC thermistor 1 includes ceramic body 2 and electrodes 3a and 3b, wherein ceramic body 2 comprises the $BaTiO_3$ based semiconductor ceramic composition of the present invention, and electrodes 3a and 3b are formed on the two opposite main surfaces of the ceramic body. Electrodes 3a and 3b can be formed by an one-layered structure or a multi-layered structure made of conductive material(s) of Cu, Ni, Al, Cr, Zn, Ag, Ni—Cr alloy, Ni—Cu alloy or the like. In addition, the shape of PTC thermistor 1 shown in FIG. 1 is a disc plate shape, but it also may be a cuboid shape. Further, electrodes 3a and 3b can be formed by plating, sputtering, vapor deposition, screen printing or the like. An external power source can be electric connected to these electrodes 3a and 3b through, for example, wires not shown in figure or the like.

The PTC thermistor of the present embodiment can be prepared by, for example, the following method. First, a semiconductor composition is prepared by the method mentioned above. After that, it is processed into a specific size according to the requirements and ceramic compact 2 is formed. Then, electrodes 3a and 3b are deposited on ceramic compact 2 by, for example, vapor deposition to obtain the PTC thermistor shown in FIG. 1.

The semiconductor ceramic composition of the present embodiment can be used in, for example, a heater element or an overheat detection element or the like. And in addition, it can also be used in other applications.

EXAMPLES

Hereinafter, the present invention will be further described in detail based on Examples and Comparative Examples. However, the present invention is not limited to any of the following Examples.

Examples 1 to 73, Comparative Examples 1 to 27

As raw materials, $BaCO_3$, $TiO_2$, $Bi_2O_3$, $Na_2CO_3$, $K_2CO_3$, $CaCO_3$, $SiO_2$, $MnCO_3$, oxides of RE (for example, $Y_2O_3$), and oxides of TM (for example, $Nb_2O_5$) were prepared, and each of the materials was weighed in a way that the composition after sintered would be as shown in tables 1~9. After wet-mixed in ethanol with a ball mill, the mixture was dried and calcined for 2 hours under 800° C.

The calcined body was wet-pulverized in pure water using a ball mill, and after drying were carried out. Then it was granulated using binders such as PVA and the like to obtain granulated powder. The granulated powder was molded into a cylindrical shape (diameter of 17 mm×thickness of 1.0 mm) with a uniaxial pressing machine, and then sintered in the air atmosphere under 1200° C. for 2 hours to obtain a sintered compact.

Ag—Zn paste was coated by screen printing on the two surfaces of the sintered compact and then baked in the air under 500~800° C. Then the temperature characteristics of resistivity from 25° C. to 280° C. were measured. Also, the withstand voltage (break-down voltage) was measured by applying voltage slowly between the electrodes under 25° C. The measured value was divided by the plate thickness (the unit is mm) of the semiconductor ceramic composition to obtain the value of the withstand voltage $V_0$ (V/mm).

After electrifying experiment was carried out by applying a DC voltage of 20V for 1000 hours, the resistivity $\rho_0$ before the electrifying experiment and the resistivity $\rho_1$ after the electrifying experiment were respectively measured at 25° C. Then the difference $\Delta\rho(=\rho_1-\rho_0)$ was calculated and the resistance change rate $\Delta\rho/\rho_0$ was calculated. The results were shown in Tables 1 to 8.

Example 74

A semiconductor ceramic composition was prepared in the same way as Example 1, except that the atmosphere during sintering was set to be nitrogen atmosphere, and the heat-treatment was carried out in the air under 800° C. And the evaluation was carried out in the same way as Examples 1 to 73. The results were shown in Table 9.

From table 1, it could be known that there was a correlation between the component range x of Bi element and the Curie Point. From Examples 1 to 5, it could be known that when the component range of Bi element was in a range of $0.01 \leq x \leq 0.15$, the Curie Point shifted to a temperature higher than 120° C. which is the Curie Point of $BaTiO_3$, and the resistivity at 25° C. was 500 Ωcm or less, the withstand voltage was 400 V/mm or above and the resistance change rate $\Delta\rho/\rho_0$ was kept 20% or lower. In addition, it could be known that the more amount of x was, the more higher temperature the Curie Point shifted to, and the resistivity at 25° C. tended to increase slightly. In Comparative Example 1 in which the component range of Bi element was less than 0.01, the resistivity at 25° C. was small, but the Curie Point was 120° C. or less. Moreover, it could be known that in Comparative Example 2 in which the component range of Bi exceeded 0.15, the resistivity at 25° C. was far more than 500 Ωcm.

TABLE 1

| Sample No. | x [mol] 0.01~0.15 | y [mol] 0~0.3 | Na/(Na + K) 0.1~1 | m 0.950~1.050 | Ca [mol] 0.001~0.055 | w + z [mol] 0~0.010 | Si [mol] 0~0.035 |
|---|---|---|---|---|---|---|---|
| Comparative example 1 | 0.007 | 0.2 | 0.2 | 0.999 | 0.055 | 0 | 0 |
| Example 1 | 0.01 | | | | | | |
| Example 2 | 0.03 | | | | | | |
| Example 3 | 0.05 | | | | | | |
| Example 4 | 0.10 | | | | | | |
| Example 5 | 0.15 | | | | | | |
| Comparative example 2 | 0.16 | | | | | | |

TABLE 1-continued

| Sample No. | Mn [mol] 0~0.0015 | resistivity at 25° C. [Ωcm] | Tc [° C.] | resistance change rate Δρ/ρ₀ [%] | V₀ [V/mm] | Remark |
|---|---|---|---|---|---|---|
| Comparative example 1 | 0 | 310 | 115 | 17 | 408 | Curie Point x |
| Example 1 | | 428 | 140 | 11 | 514 | |
| Example 2 | | 422 | 150 | 9 | 423 | |
| Example 3 | | 458 | 170 | 13 | 652 | |
| Example 4 | | 483 | 210 | 13 | 415 | |
| Example 5 | | 486 | 220 | 16 | 625 | |
| Comparative example 2 | | 1.5E+06 | — | — | — | resistivity at 25° C. x |

It could be known from Table 2 that, the component range y of A which can provide good PTC property was correlated with the component range x of Bi element. In addition, A contained both elements of Na and K. It could be known from Examples 1, 3, 5 and 6 to 13 that, if the component range y was in a range of 0<y≤0.30, the resistivity at 25° C. would be small, the withstand voltage was 400 V/mm or above and the resistance change rate Δρ/ρ₀ was kept 20% or lower. In addition, if x was fixed, there was a tendency that the withstand voltage would increase with the increase of y. Additionally, it was known that in Comparative Examples 4, 6 and 8 in which the component range of y surpassed 0.30, the withstand voltage would be high, but the resistivity at 25° C. would be much higher than 500 Ωcm.

TABLE 2

| Sample No. | x [mol] 0.01~0.15 | y [mol] 0~0.3 | Na/(Na + K) 0.1~1 | m 0.950~1.050 | Ca [mol] 0.001~0.055 | Si [mol] 0~0.035 | Mn [mol] 0~0.0015 | resistivity at 25° C. [Ωcm] | Tc [° C.] | resistance change rate Δρ/ρ₀ [%] | V₀ [V/mm] | Remark |
|---|---|---|---|---|---|---|---|---|---|---|---|---|
| Comparative example 3 | 0.01 | 0 | — | 0.999 | 0.055 | 0 | 0 | 315 | 120 | 17 | 300 | V₀ x |
| Example 6 | | 0.01 | 0.20 | | | | | 333 | 120 | 12 | 403 | |
| Example 7 | | 0.1 | 0.20 | | | | | 350 | 125 | 12 | 410 | |
| Example 1 | | 0.2 | 0.20 | | | | | 428 | 140 | 11 | 514 | |
| Example 8 | | 0.3 | 0.20 | | | | | 471 | 155 | 13 | 672 | |
| Comparative example 4 | | 0.32 | 0.20 | | | | | 3.2E+04 | — | — | — | resistivity at 25° C. x |
| Comparative example 5 | 0.05 | 0 | — | 0.999 | 0.055 | 0 | 0 | 378 | 125 | 19 | 302 | V₀ x |
| Example 9 | | 0.05 | 0.20 | | | | | 395 | 140 | 18 | 402 | |
| Example 10 | | 0.1 | 0.20 | | | | | 440 | 165 | 11 | 418 | |
| Example 3 | | 0.2 | 0.20 | | | | | 458 | 170 | 13 | 652 | |
| Example 11 | | 0.3 | 0.20 | | | | | 487 | 175 | 17 | 806 | |
| Comparative example 6 | | 0.32 | 0.20 | | | | | 6.5E+04 | — | — | — | resistivity at 25° C. x |
| Comparative example 7 | 0.15 | 0 | — | 0.999 | 0.055 | 0 | 0 | 423 | 125 | 19 | 296 | V₀ x |
| Example 12 | | 0.15 | 0.20 | | | | | 483 | 215 | 13 | 415 | |
| Example 5 | | 0.2 | 0.20 | | | | | 486 | 220 | 16 | 625 | |
| Example 13 | | 0.3 | 0.20 | | | | | 499 | 230 | 14 | 853 | |
| Comparative example 8 | | 0.32 | 0.20 | | | | | 8.3E+04 | — | — | — | resistivity at 25° C. x |

It could be known from Table 3 that, in Comparative example 9 in which the ratio of Na/(Na+K) of Na and K was lower than 0.1, the resistivity at 25° C. exceeded 500 Ωcm. In Comparative Example 10 in which the ratio of Na/(Na+K) of Na and K was 1.00, the withstand voltage would not be high. In addition, it could be known that the lower the ratio of Na/(Na+K) of Na and K was, the higher the Curie temperature and the withstand voltage were.

TABLE 3

| Sample No. | x [mol] 0.01~0.15 | y [mol] 0~0.3 | Na/ (Na + K) 0.1~1 | m 0.950~1.050 | Ca [mol] 0.001~0.055 | Si [mol] 0~0.035 | Mn [mol] 0~0.0015 | resistivity at 25° C. [Ωcm] | Tc [° C.] | resistance change rate Δρ/ρ0 [%] | $V_0$ [V/mm] | Remark |
|---|---|---|---|---|---|---|---|---|---|---|---|---|
| Comparative example 9 | 0.1 | 0.1 | 0.01 | 0.999 | 0.055 | 0 | 0 | 5.5E+06 | — | — | — | resistivity at 25° C.x |
| Example 14 | | | 0.10 | | | | | 333 | 220 | 12 | 1129 | |
| Example 15 | | | 0.50 | | | | | 350 | 200 | 9 | 895 | |
| Example 16 | | | 0.70 | | | | | 428 | 195 | 11 | 514 | |
| Example 17 | | | 0.99 | | | | | 471 | 185 | 13 | 406 | |
| Comparative example 10 | | | 1.00 | | | | | 398 | 185 | 19 | 304 | $V_0$x |

It could be known from Table 4 that, the ratio m of Ba site (v+w+x+y) to Ti site (the total number of moles of Ti and TM) was correlated with the resistivity at 25° C. And it was known that in the Examples 18, 19 and 20 in which m was in a range of 0.950≤m≤1.050, the resistivity at 25° C. was small, the withstand voltage was 400 V/mm or above and the resistance change rate Δρ/ρ0 shifted to 20% or less. And it was known that in Comparative Example 11 in which m was less than 0.950, the resistivity at 25° C. was larger than 500 Ωcm; and in Comparative Example 12 in which m exceeded 1.050, the withstand voltage was 400 V/mm or less.

TABLE 4

| Sample No. | x [mol] 0.01~0.15 | y [mol] 0~0.3 | Na/(Na + K) 0.1~1 | m 0.950~1.050 | Ca [mol] 0.001~0.055 | w + z [mol] 0~0.010 | Si [mol] 0~0.035 |
|---|---|---|---|---|---|---|---|
| Comparative example 11 | 0.1 | 0.1 | 0.2 | 0.940 | 0.055 | 0 | 0 |
| Example 18 | | | | 0.950 | | | |
| Example 19 | | | | 0.999 | | | |
| Example 20 | | | | 1.050 | | | |
| Comparative example 12 | | | | 1.070 | | | |

| Sample No. | Mn [mol] 0~0.0015 | resistivity at 25° C. [Ωcm] | Tc [° C.] | resistance change rate Δρ/ρ0 [%] | $V_0$ [V/mm] | Remark |
|---|---|---|---|---|---|---|
| Comparative example 11 | 0 | 5.0E+04 | — | — | — | resistivity at 25° C.x |
| Example 18 | | 477 | 210 | 12 | 436 | |
| Example 19 | | 483 | 210 | 13 | 415 | |
| Example 20 | | 465 | 210 | 11 | 429 | |
| Comparative example 12 | | 475 | 210 | 13 | 354 | $V_0$x |

It could be known from Table 5 that, the component range of the subcomponent Ca was correlated with the resistivity at 25° C. In Examples 19, 21 and 22 in which the component range of Ca was in a range of 0.001 mol or more and 0.055 mol or less, the resistivity at 25° C. was small, the withstand voltage was 400 V/mm or above and the resistance change rate Δρ/ρ0 shifted to 20% or less. And it was known that in Comparative Example 13 in which the component range of Ca was less than 0.001 mol, the resistivity at 25° C. increased; and in Comparative Example 14 in which the component range of Ca exceeded 0.055 mol, the withstand voltage was lower than 400 V/mm.

TABLE 5

| Sample No. | x [mol] 0.01~0.15 | y [mol] 0~0.3 | Na/(Na + K) 0.1~1 | m 0.950~1.050 | Ca [mol] 0.001~0.055 | w + z [mol] 0~0.010 | Si [mol] 0~0.035 |
|---|---|---|---|---|---|---|---|
| Comparative example 13 | 0.1 | 0.1 | 0.2 | 0.999 | 0.0008 | 0 | 0 |
| Example 21 | | | | | 0.001 | | |
| Example 22 | | | | | 0.03 | | |

TABLE 5-continued

| | | | | | | |
|---|---|---|---|---|---|---|
| Example 19 | | | | | 0.055 | |
| Comparative example 14 | | | | | 0.058 | |

| Sample No. | Mn [mol] 0~0.0015 | resistivity at 25° C. [Ωcm] | Tc [° C.] | resistance change rate $\Delta\rho/\rho_0$ [%] | $V_0$ [V/mm] | Remark |
|---|---|---|---|---|---|---|
| Comparative example 13 | 0 | 5.5E+04 | — | — | — | resistivity at 25° C.x |
| Example 21 | | 454 | 210 | 12 | 435 | |
| Example 22 | | 440 | 210 | 9 | 409 | |
| Example 19 | | 483 | 210 | 13 | 415 | |
| Comparative example 14 | | 478 | 210 | 13 | 275 | $V_0$x |

It could be known from Examples 23 to 64 in Table 6 that, if the total amount of RE and TM: (w+z) was 0.01 or lower, there was an effect of decreasing the resistivity at 25° C. Additionally, as for Comparative Examples 15 to 27 in which (w+z) exceeded 0.01, the resistivity at 25° C. was more than 500 S/cm. Further, from Examples 59 to 64, it could be known that even among the cases that the values of (w+z) were the same, when RE and TM were added in equal amount each, the resistivity at 25° C. was small.

TABLE 6

| Sample No. | x [mol] 0.01–0.15 | y [mol] 0–0.3 | Na/(Na + K) 0.1–1 | m 0.950–1.050 | Ca [mol] 0.001–0.055 | RE | M | w [mol] 0–0.010 | z [mol] 0–0.010 | Si [mol] 0–0.035 | Mn [mol] 0–0.0015 | resistivity at 25° C. [Ωcm] | Tc [° C.] | resistance change rate Δρ/ρ₀ [%] | V₀ [V/mm] | Remark |
|---|---|---|---|---|---|---|---|---|---|---|---|---|---|---|---|---|
| Example 23 | 0.1 | 0.1 | 0.2 | 0.999 | 0.055 | Y | | 0.001 | 0 | 0 | 0 | 386 | 210 | 17 | 528 | |
| Example 24 | | | | | | | | 0.005 | 0 | 0 | 0 | 376 | 210 | 12 | 555 | |
| Example 25 | | | | | | | | 0.01 | 0 | 0 | 0 | 345 | 210 | 9 | 527 | |
| Comparative example 15 | | | | | | | | 0.012 | 0 | 0 | 0 | 4.8E+04 | — | — | — | resistivity at 25° C.x |
| Example 26 | 0.1 | 0.1 | 0.2 | 0.999 | 0.055 | La | | 0.001 | 0 | 0 | 0 | 421 | 210 | 13 | 521 | |
| Example 27 | | | | | | | | 0.005 | 0 | 0 | 0 | 363 | 210 | 9 | 570 | |
| Example 28 | | | | | | | | 0.01 | 0 | 0 | 0 | 336 | 210 | 12 | 535 | |
| Comparative example 16 | | | | | | | | 0.012 | 0 | 0 | 0 | 8.0E+04 | — | — | — | resistivity at 25° C.x |
| Example 29 | 0.1 | 0.1 | 0.2 | 0.999 | 0.055 | Ce | | 0.001 | 0 | 0 | 0 | 448 | 210 | 17 | 499 | |
| Example 30 | | | | | | | | 0.005 | 0 | 0 | 0 | 419 | 210 | 13 | 538 | |
| Example 31 | | | | | | | | 0.01 | 0 | 0 | 0 | 398 | 210 | 9 | 577 | |
| Comparative example 17 | | | | | | | | 0.012 | 0 | 0 | 0 | 7.0E+04 | — | — | — | resistivity at 25° C.x |
| Example 32 | 0.1 | 0.1 | 0.2 | 0.999 | 0.055 | Pr | | 0.001 | 0 | 0 | 0 | 489 | 210 | 15 | 514 | |
| Example 33 | | | | | | | | 0.005 | 0 | 0 | 0 | 472 | 210 | 17 | 500 | |
| Example 34 | | | | | | | | 0.01 | 0 | 0 | 0 | 453 | 210 | 16 | 531 | |
| Comparative example 18 | | | | | | | | 0.012 | 0 | 0 | 0 | 4.0E+04 | — | — | — | resistivity at 25° C.x |
| Example 35 | 0.1 | 0.1 | 0.2 | 0.999 | 0.055 | Nd | | 0.001 | 0 | 0 | 0 | 398 | 210 | 12 | 535 | |
| Example 36 | | | | | | | | 0.005 | 0 | 0 | 0 | 369 | 210 | 11 | 498 | |
| Example 37 | | | | | | | | 0.01 | 0 | 0 | 0 | 333 | 210 | 10 | 509 | |
| Comparative example 19 | | | | | | | | 0.012 | 0 | 0 | 0 | 7.0E+04 | — | — | — | resistivity at 25° C.x |
| Example 38 | 0.1 | 0.1 | 0.2 | 0.999 | 0.055 | Sm | | 0.001 | 0 | 0 | 0 | 412 | 210 | 10 | 554 | |
| Example 39 | | | | | | | | 0.005 | 0 | 0 | 0 | 421 | 210 | 8 | 529 | |
| Example 40 | | | | | | | | 0.01 | 0 | 0 | 0 | 378 | 210 | 7 | 578 | |
| Comparative example 20 | | | | | | | | 0.012 | 0 | 0 | 0 | 5.0E+04 | — | — | — | resistivity at 25° C.x |
| Example 41 | 0.1 | 0.1 | 0.2 | 0.999 | 0.055 | Gd | | 0.001 | 0 | 0 | 0 | 422 | 210 | 17 | 587 | |
| Example 42 | | | | | | | | 0.005 | 0 | 0 | 0 | 452 | 210 | 11 | 547 | |
| Example 43 | | | | | | | | 0.01 | 0 | 0 | 0 | 409 | 210 | 13 | 547 | |
| Comparative example 21 | | | | | | | | 0.012 | 0 | 0 | 0 | 3.0E+04 | — | — | — | resistivity at 25° C.x |
| Example 44 | 0.1 | 0.1 | 0.2 | 0.999 | 0.055 | Dy | | 0.001 | 0 | 0 | 0 | 452 | 210 | 16 | 519 | |
| Example 45 | | | | | | | | 0.005 | 0 | 0 | 0 | 413 | 210 | 12 | 583 | |
| Example 46 | | | | | | | | 0.01 | 0 | 0 | 0 | 386 | 210 | 10 | 540 | |

TABLE 6-continued

| Sample No. | x [mol] 0.01~0.15 | y [mol] 0~0.3 | Na/(Na + K) 0.1~1 | m 0.950~1.050 | Ca [mol] 0.001~0.055 | RE | M | w [mol] 0~0.010 | z [mol] | Si [mol] 0~0.035 | Mn [mol] 0~0.0015 | resistivity at 25° C. [Ωcm] | Tc [° C.] | resistance change rate Δρ/ρ₀ [%] | V₀ [V/mm] | Remark |
|---|---|---|---|---|---|---|---|---|---|---|---|---|---|---|---|---|
| Comparative example 22 | | | | | | | | 0.012 | 0 | | | 4.0E+04 | — | — | — | resistivity at 25° C. x |
| Example 47 | 0.1 | 0.1 | 0.2 | 0.999 | 0.055 | Er | | 0.001 | 0 | 0 | 0 | 407 | 210 | 14 | 568 | |
| Example 48 | | | | | | | | 0.005 | 0 | | | 353 | 210 | 12 | 561 | |
| Example 49 | | | | | | | | 0.01 | 0 | | | 333 | 210 | 10 | 583 | |
| Comparative example 23 | | | | | | | | 0.012 | 0 | | | 5.5E+04 | — | — | — | resistivity at 25° C. x |
| Example 50 | 0.1 | 0.1 | 0.2 | 0.999 | 0.055 | | V | 0 | 0.001 | 0 | 0 | 448 | 210 | 18 | 583 | |
| Example 51 | | | | | | | | 0 | 0.005 | | | 382 | 210 | 13 | 558 | |
| Example 52 | | | | | | | | 0 | 0.01 | | | 325 | 210 | 17 | 507 | |
| Comparative example 24 | | | | | | | | 0 | 0.012 | | | 1.1E+05 | — | — | — | resistivity at 25° C. x |
| Example 53 | 0.1 | 0.1 | 0.2 | 0.999 | 0.055 | | Nb | 0 | 0.001 | 0 | 0 | 353 | 210 | 13 | 507 | |
| Example 54 | | | | | | | | 0 | 0.005 | | | 332 | 210 | 9 | 533 | |
| Example 55 | | | | | | | | 0 | 0.01 | | | 299 | 210 | 11 | 582 | |
| Comparative example 25 | | | | | | | | 0 | 0.012 | | | 4.0E+04 | — | — | — | resistivity at 25° C. x |
| Example 56 | 0.1 | 0.1 | 0.2 | 0.999 | 0.055 | | Ta | 0 | 0.001 | 0 | 0 | 443 | 210 | 17 | 527 | |
| Example 57 | | | | | | | | 0 | 0.005 | | | 417 | 210 | 13 | 512 | |
| Example 58 | | | | | | | | 0 | 0.01 | | | 391 | 210 | 15 | 581 | |
| Comparative example 26 | | | | | | | | 0 | 0.012 | | | 7.0E+04 | — | — | — | resistivity at 25° C. x |
| Example 59 | 0.1 | 0.1 | 0.2 | 0.999 | 0.055 | Gd | Nb | 0.0025 | 0.0025 | 0 | 0 | 198 | 210 | 13 | 559 | |
| Example 60 | | | | | | | | 0.001 | 0.004 | | | 213 | 210 | 11 | 567 | |
| Example 61 | | | | | | | | 0.004 | 0.001 | | | 272 | 210 | 9 | 554 | |
| Example 62 | | | | | | | | 0.005 | 0.005 | | | 192 | 210 | 9 | 499 | |
| Example 63 | | | | | | | | 0.002 | 0.008 | | | 203 | 210 | 12 | 575 | |
| Example 64 | | | | | | | | 0.008 | 0.002 | | | 203 | 210 | 15 | 511 | |
| Comparative example 27 | | | | | | | | 0.006 | 0.006 | | | 5.0E+04 | — | — | — | resistivity at 25° C. x |

It could be known from the Examples 19 and 65 to 69 in Table 7 that, there would be an effect of decreasing the resistivity at 25° C. by adding Si in the proportion of 0.035 mol or less in terms of element relative to 1 mol of Ti site (the total number of moles of Ti and TM)(u+z).

TABLE 7

| Sample No. | x [mol] 0.01~0.15 | y [mol] 0~0.3 | Na/(Na + K) 0.1~1 | m 0.950~1.050 | Ca [mol] 0.001~0.055 | w + z [mol] 0~0.010 | Si [mol] 0~0.035 |
|---|---|---|---|---|---|---|---|
| Example 19 | 0.1 | 0.1 | 0.2 | 0.999 | 0.055 | 0 | 0 |
| Example 65 | | | | | | | 0.005 |
| Example 66 | | | | | | | 0.010 |
| Example 67 | | | | | | | 0.020 |
| Example 68 | | | | | | | 0.030 |
| Example 69 | | | | | | | 0.035 |

| Sample No. | Mn [mol] 0~0.0015 | resistivity at 25° C. [Ωcm] | Tc [° C.] | resistance change rate $\Delta\rho/\rho_0$ [%] | $V_0$ [V/mm] | Remark |
|---|---|---|---|---|---|---|
| Example 19 | 0 | 483 | 210 | 13 | 415 | |
| Example 65 | | 326 | 210 | 12 | 435 | |
| Example 66 | | 317 | 210 | 9 | 444 | |
| Example 67 | | 312 | 210 | 11 | 462 | |
| Example 68 | | 365 | 210 | 13 | 483 | |
| Example 69 | | 466 | 210 | 9 | 453 | |

It could be known from Examples 19 and 70 to 73 in Table 8 that, there would be an effect of increasing the PTC jump by adding Mn in the proportion of 0.0015 mol or less in terms of element relative to 1 mol of Ti site (the total number of moles of Ti and TM).

TABLE 8

| Sample No. | x [mol] 0.01~0.15 | y [mol] 0~0.3 | Na/(Na + K) 0.1~1 | m 0.950~1.050 | Ca [mol] 0.001~0.055 | w + z [mol] 0~0.010 | Si [mol] 0~0.035 |
|---|---|---|---|---|---|---|---|
| Example 19 | 0.1 | 0.1 | 0.2 | 0.999 | 0.55 | 0 | 0 |
| Example 70 | | | | | | | |
| Example 71 | | | | | | | |
| Example 72 | | | | | | | |
| Example 73 | | | | | | | |

| Sample No. | Mn [mol] 0~0.0015 | resistivity at 25° C. [Ωcm] | Tc [° C.] | resistance change rate $\Delta\rho/\rho_0$ [%] | $V_0$ [V/mm] | PTC Jump [orders of magnitude] | Remark |
|---|---|---|---|---|---|---|---|
| Example 19 | 0 | 483 | 210 | 13 | 415 | 2.51 | |
| Example 70 | 0.0005 | 386 | 210 | 12 | 455 | 3.21 | |
| Example 71 | 0.00075 | 374 | 210 | 9 | 441 | 3.89 | |
| Example 72 | 0.0010 | 342 | 210 | 11 | 467 | 4.03 | |
| Example 73 | 0.0015 | 365 | 210 | 13 | 483 | 3.98 | |

It could be known from Examples 19 and 74 in Table 9 that, when the atmosphere during sintering was set to be nitrogen atmosphere ($PO_2=10^{-7}$ atm), almost the same performance as that in the case of sintering in the air could be obtained.

TABLE 9

| Sample No. | x [mol] 0.01~0.15 | y [mol] 0~0.3 | Na/(Na + K) 0.1~1 | m 0.950~1.050 | Ca [mol] 0.001~0.055 | w + z [mol] 0~0.010 | Si [mol] 0~0.035 |
|---|---|---|---|---|---|---|---|
| Example 19 | 0.1 | 0.1 | 0.2 | 0.999 | 0.55 | 0 | 0 |
| Example 74 | | | | | | | |

| Sample No. | Mn [mol] 0~0.0015 | resistivity at 25° C. [Ωcm] | Tc [° C.] | resistance change rate Δρ/ρ₀ [%] | V₀ [V/mm] | Remark |
|---|---|---|---|---|---|---|
| Example 19 | 0 | 483 | 210 | 13 | 415 | In the air |
| Example 74 | | 304 | 210 | 12 | 434 | In nitrogen |

DESCRIPTION OF REFERENCE NUMERALS

1 PTC thermistor
2 ceramic body
3a, 3b electrodes

What is claimed is:

1. A semiconductor ceramic composition comprising:
   Ca in a proportion of 0.001 mol or more and 0.055 mol or less in terms of element relative to 1 mol of Ti site, and a sintered compact containing a $BaTiO_3$ based compound represented by the following general formula (1) as a main component, $$(Ba_vBi_xA_yRE_w)_m(Ti_uTM_z)O_3 \quad (1)$$

where:
   A contains both elements of Na and K;
   RE is at least one element selected from the group consisting of Y, La, Ce, Pr, Nd, Sm, Gd, Dy, and Er;
   TM is at least one element selected from the group consisting of V, Nb, and Ta; and
   w, x, y, z and m satisfy the following formulas (2) through (7), $$0.01 \leq x \leq 0.15 \quad (2)$$

$$x \leq y \leq 0.3 \quad (3)$$

$$0 \leq (w+z) \leq 0.01 \quad (4)$$

$$v+x+y+w=1 \quad (5)$$

$$u+z=1 \quad (6)$$

$$0.950 \leq m \leq 1.050 \quad (7)$$

wherein
   Ti site represents a total number of moles of Ti and TM; and
   a ratio of Na/(Na+K) is 0.1 or more and 0.5 or less.

2. The semiconductor ceramic composition according to claim 1, further comprising Si in a proportion of 0.035 mol or less in terms of element relative to 1 mol of Ti site.

3. The semiconductor ceramic composition according to claim 1, further comprising Mn in a proportion of 0.0015 mol or less in terms of element relative to 1 mol of Ti site.

4. A PTC thermistor comprising:
   a ceramic body formed from the semiconductor ceramic composition according claim 1; and
   electrodes formed on the surfaces of the ceramic body.

5. The semiconductor ceramic composition according to claim 2, further comprising Mn in a proportion of 0.0015 mol or less in terms of element relative to 1 mol of Ti site.

6. A PTC thermistor comprising:
   a ceramic body formed from the semiconductor ceramic composition according to claim 2; and
   electrodes formed on the surfaces of the ceramic body.

7. A PTC thermistor comprising:
   a ceramic body formed from the semiconductor ceramic composition according to claim 3; and
   electrodes formed on the surfaces of the ceramic body.

8. A PTC thermistor comprising:
   a ceramic body formed from the semiconductor ceramic composition according to claim 5; and
   electrodes formed on the surfaces of the ceramic body.

* * * * *